US 7,647,287 B1

(12) United States Patent
Slonim et al.

(10) Patent No.: US 7,647,287 B1
(45) Date of Patent: Jan. 12, 2010

(54) SUGGESTING A RELATIONSHIP FOR A NODE PAIR BASED UPON SHARED CONNECTIONS VERSUS TOTAL CONNECTIONS

(75) Inventors: Noam Slonim, Jerusalem (IL); Elad Yom-Tov, DN Hamovil (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/276,071

(22) Filed: Nov. 21, 2008

(51) Int. Cl.
  G06N 5/02 (2006.01)
  G06E 1/00 (2006.01)
  G06E 3/00 (2006.01)
  G06G 7/00 (2006.01)

(52) U.S. Cl. .............................. 706/46; 706/18; 706/26; 706/27

(58) Field of Classification Search .................. 706/18, 706/26–27, 46
See application file for complete search history.

(56) References Cited

U.S. PATENT DOCUMENTS

| 7,043,476 | B2 | 5/2006 | Robson |
| 2002/0169562 | A1 | 11/2002 | Stephanopoulos et al. |
| 2008/0147884 | A1 | 6/2008 | Kwon |
| 2008/0228601 | A1 | 9/2008 | Rice et al. |

FOREIGN PATENT DOCUMENTS

WO  0116805 A2  3/2001

OTHER PUBLICATIONS

Wren, J., "Extending the Mutual Information Measure to Rank Inferred Literature Relationships," BMC Bioinformatics, vol. 5, p. 145, Oct. 7, 2004. (See p. 4, end of 1st para; p. 5, "The Mutual Information Measure" section; p. 6, "Inferring New Associations Based Upon Commonalities" section).
Sahami, M., "Mining the Web to Determine Similarity between Words, Objects, and Communities," [online] American Association for Artificial Intelligence, [retrieved on Oct. 22, 2008], retrieved from the Internet: <http://robotics.stanford.edu/users/sahami/papersdir/FLAIRS-06.pdf>. (See, Abstract; p. 4, "Comparing Similarity Functions" section; p. 5, "Conclusions").
Gardner, T.S., et al., "Reverse-Engineering Transcription Control Networks," Physics of Life Reviews, vol. 2, No. 1, pp. 65-88, Mar. 2005.
Liben-Nowell, D., et al., "The Link-Prediction Problem for Social Networks," Journal of American Society for Information Science and Technology, vol. 58, No. 7, pp. 1019-1031, 2007.

*Primary Examiner*—David R Vincent
*Assistant Examiner*—Benjamin Buss
(74) *Attorney, Agent, or Firm*—Patents on Demand, PA; Brian K. Buchheit

(57) ABSTRACT

A first total number of nodes in a first node set directly linked to a first node can be computed. A second total number of nodes in a second node set directly linked to a second node can be computed. A shared total number of nodes in a union of the first node set and the second node set can be computed. A mutual information metric can then be computed from the first total, the second total, and the shared total. A decision as to whether a new connection should be added between the first node and the second node, which were not previously directly connected, can be determined from the value of mutual information metric.

9 Claims, 1 Drawing Sheet

SUGGESTING A RELATIONSHIP FOR A NODE PAIR BASED UPON SHARED CONNECTIONS VERSUS TOTAL CONNECTIONS

BACKGROUND

The present invention relates to the field nodal networks, and more specifically to suggesting a relationship for a node pair based upon shared connections versus total connections.

Many situations exist within computer science, where data can be represented as a set of nodes, which are linked to other nodes through a definable relationship. Often this relationship is visually shown using a graph, where edges connecting nodes represent the relationship. These relationships can be unidirectional or directional.

Often, it can be desirable to infer an existence of new direct associations between two nodes, which otherwise lack a direct connection. In other words, this disclosure concerns a link prediction problem of inferring direct linkages between nodes using features intrinsic to a nodal network. An ability to effectively predict or infer new direct links would have broad applicability in many data centric fields. Application could include, for example, suggesting new links among Web pages, determining new interactions in protein-protein networks, ascertaining new citations for scientific or academic articles, automatically detecting existing work related to a reference set of scientific projects, inferring new direct connections (i.e., introducing a pair of previous strangers) in a social networking context, and the like. Another embodiment of this disclosure is the measuring of strength between nodes, which already are connected.

One known technique for inferring new relationships uses metadata about a node, such as textual information or background information to build new associations. For instance, in a social networking context, a user can be required/encouraged to provide additional information, such as hobbies, hometown, attended schools, occupation, organizations which an individual is involved, etc. This additional information is matched against the information provided by others, which is used to suggest a set of people who a user may wish to interact (i.e., send an invitation to view a personal space, converse via email, etc.). In an electronic document comparison context (photo tourism, for example), tags included within documents can be used to determine a set of related documents sharing a common set of tags. Metadata, however, is often not available or trustworthy, which causes metadata based relationship suggestion techniques to fail.

DETAILED DESCRIPTION

Figure 1:
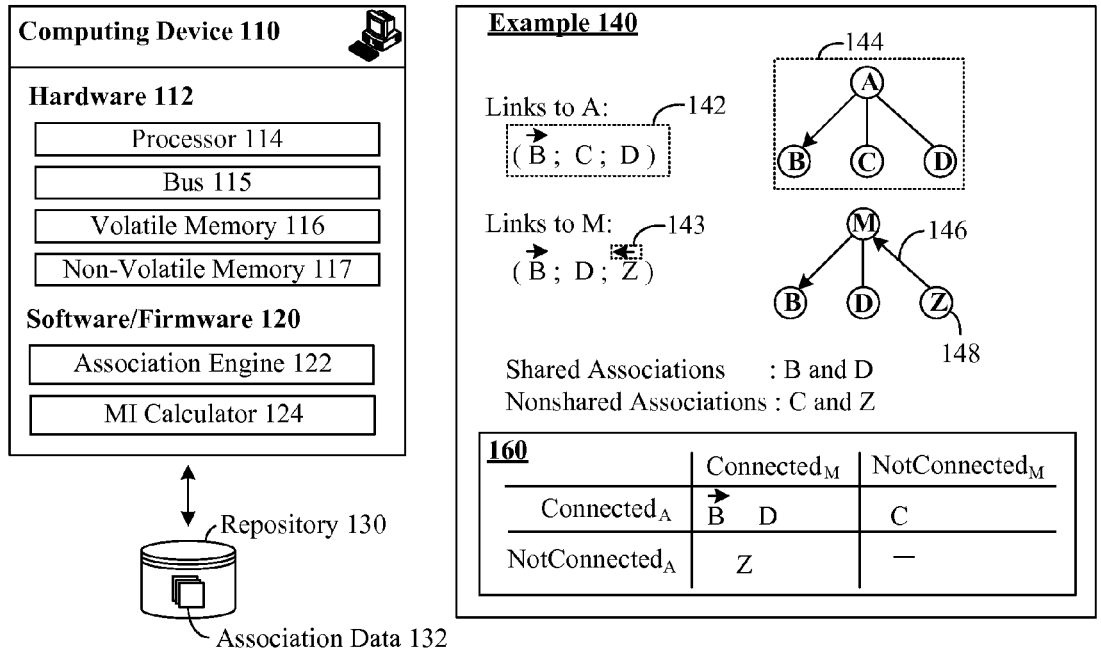
FIG. 1 is a schematic diagram describing a mutual information (MI) metric and how it can be used to suggest new associations between a homogonous set of nodes.

The present disclosure teaches a mutual information (MI) metric that suggests new associations between a homogonous set of nodes. Mutual information expressed by the mutual information metric can be measured by counting a number of shared associations and those associations that are not shared between two nodes that are not directly connected. The mutual information metric can be computed using intrinsic features of a nodal networks consisting of homogonous nodes and can be computed without using any metadata associated with the nodes. Applications for the mutual information metric include, but are not limited to, suggesting new links among Web pages, suggesting new interactions in protein-to-protein networks, suggesting new citations for scientific/academic articles, automatically detecting existing work related to a scientific/academic project, suggesting new relationships between people in a social network, measuring the strength of connection between people in a communication network or social website, and the like.

Stated differently, a first total number of nodes in a first node set directly linked to a first node can be computed. A second total number of nodes in a second node set directly linked to a second node can be computed. A shared total number of nodes in an intersection of the first node set and the second node set can be computed. A mutual information metric can then be computed from the first total, the second total, and the shared total. A decision as to whether a new connection should be added between the first node and the second node, which were not previously directly connected, can be determined from the value of mutual information metric.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a storage medium such as a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram describing a mutual information (MI) metric and how it can be used to suggest new associations between a homogonous set of nodes. The homogonous set of nodes means that each node is substantially of the same kind. For example, each node in the homogonous set can represent a person, a document, a protein, and the like. A MI metric can be computed by an MI calculator 124 based upon association data 132 of an association repository 130. The association data 132 can define a nodal network of a set of substantially homogonous nodes linked to each other. The MI calculator 124 and an association engine 122 can be implemented in software/firmware 120 executing on a computing device 110. Hardware 112 of the computing device 110 can include one or more processors 114 connected to a volatile memory 116 and a non-volatile memory 117 via a bus 115. The software/firmware 120 can be stored in any storage medium, including volatile memory 116 and non-volatile memory 117.

Example 140 shows a graph 144 where Node A is directly linked to Node B, Node C, and Node D. Another graph shows Node M is directly linked to Node B, Node D, and Node Z. An alternative representation of these graphs is a node set 142. Illustrated nodes sets show nodes connected to nodes A and M, respectively.

A two-by-two contingency table 160 expresses that the set of shared nodes connected to both Nodes A and Nodes M includes Node B and Node D. Table 160 also shows that Node C is connected to Node A but not Node M; that Node Z is connected to Node M but not Node A; and that no nodes are defined that are not connected to Node A and that are also not connected to Node M.

Although in one contemplated embodiment a direction of links between nodes can be irrelevant, in another, directions of links can be important. Optional directional indicators 143 can be placed next to nodes that indicate different directional states concerning the links between that node and a reference node. Directional states can include unidirectional state (shown in example 140 without an indicator 143), a node-to-reference direction (shown with a left arrow), and a reference to node direction (shown with a right arrow). For example, directional link is shown in graph 144 from Node A to Node B, so that node set 142 shows a right arrow above Node B.

In implementations when a directional state of a link between nodes is significant, shared nodes of table 160 can include only those nodes linked through a common link state. For instance, if a directional node (Node P) had a reference-to-node state with respect to Node A (a directional link from Node A to Node P) and a node-to-reference state with respect to Node M, then Node P would not be considered a shared node connected to both Node A and Node M.

The MI calculator 124 can compute an MI metric from values of the contingency table 160. Although any number of algorithms can be used by the MI calculator 124, a value of a computed MI metric will generally increase as the number of shared connections increases and will generally decrease as the number of total unshared connections between each reference node increases. In one embodiment, MI calculator 124 can compute mutual information of two discrete random variables X and Y using a formula of:

$$I(X;Y) = \sum_{y \in Y} \sum_{x \in X} p(x,y) \log\left(\frac{p(x,y)}{p_1(x)p_2(y)}\right),$$

where p(x,y) is the joint probability distribution function of X and Y, and p1(x) and p2(y) are the marginal probability distribution functions of X and Y respectively. The base of the log function is not defined in the above equation, nor are constants, which can be applied should weighing be desired. Implementation specific MI calculations based upon the above formula, derivatives thereof, and alternative MI computation algorithms are contemplated.

For example, sample MI calculation algorithm 170 shows one contemplated example of a formula for computing the MI metric. As shown, total shared connections can be divided by a total number of links to Node A. Total shared connections can also be divided by a total number of links to Node M. These numbers can be added then divided by two to produce a proportion of shared versus non-shared nodes. In one embodiment, constants (Const X or Constant Y) can be added to weigh one node specific result more than the other when calculating the MI metric. Computations of calculator 124 are not to be construed as limited to sample algorithm 170 and other algorithms can be used in other implementations so long as the variables are based upon table 160 data. In various embodiments, for example, the calculator 124 can base its calculations upon a Jaccard similarity coefficient, a Tanimoto coefficient, Sorensen's quotient of similarity, Mountford's index of similarity, Hamming distance, Dice's coefficient, and the like.

Regardless of how the MI metric is calculated, its value can determine or suggest whether a direct link should be created between two nodes, which were not previously connected. For example, association engine 122 can automatically create a new direct link between Node A and Node M if, and only if, a calculated MI metric value (from function 152 of MI calculator 124, for example) exceeds a previously configured threshold. In another example, a value of a MI metric can determine if a programmatic event occurs, which involves user prompting. For instance, a user can be prompted as to whether they wish to add a new direct connection (as suggested responsive to a higher than threshold MI value) between two otherwise unrelated nodes.

In another instance, the programmatic event can present a return result (the suggested node), which would not otherwise be presented to a user. For example, a possible citation for inclusion in a scientific article can be suggested based upon that article and already cited ones commonly referenced together in other articles (e.g., each reference is a node linked to each other through citations of a common source). Applications of the disclosed MI metric are many and include such diverse concerns as suggesting links among people in a social networking context, suggesting new links among Web pages, suggesting new interactions in protein-protein networks, automatically suggesting projects related to a particular project, and the like.

Sample pseudo code 150 represents one contemplated means for utilizing a MI metric to automatically suggest and/or create new direct associations between nodes. A shown a complex node set (NodeSet) having many inter connections among nodes can be used as a source of the association data 132. This entire set can be analyzed in a pair wise fashion to determine if new associations should be created between pairs, which is represented by determining a current node pair (CurNodePair) within a looping structure.

For the node pair, a number of shared associations (TS) can be determined, as can total associations for each node ($T_A$ and $T_B$). A current MI metric value can be calculated and compared against a threshold. When it exceeds the threshold, a new association can be added between the node pair. Adding associations may occur only after other node pairs have been evaluated, to prevent new associations from affecting later-processed node pairs.

In one alternative embodiment (to code 150), a MI metric values can be calculated for each non-connected node pair of an node network. The pairs can be ordered in descending order by MI metric value and the top N number of pairs can be directly linked. In different embodiments, the node pairs can all be taken from a reference node (all node pairs having a connection with Node A, where the top N pairs by MI metric values are suggested as new links for Node A) or can be based upon an entire nodal network. In one embodiment, if a nodal network is too large to measure all pair wise associations, one contemplated heuristic can be used that filters and suggests new associations only for those nodes which have an association in one direction.

As used herein, a node 148 can represent any discrete item of a system. For example, a node 148 can represent a person, a document, a URI addressable resource, an organization and the like. Nodes 148 in a nodal network which are interconnected via links 146 should represent roughly similar items relative to the nodal system in which they belong. For example, in a social networking system, all nodes can represent people managed by the social networking system. In a document system, all nodes can represent electronic documents, and the like. A link 146 is a connection between related nodes 148, which adds information about one or both of the nodes 148.

What is claimed is:

1. A computer-implemented method of determining new connections between nodes comprising:
    identifying a homogonous set of nodes comprising a first set of a plurality of nodes, a second set of a plurality of nodes, a first node, and a second node, each node in the first set having a direct link to the first node, each node in the second set having a direct link to the second node, wherein no direct link exists between the first node and the second node;
    determining a first node connection total, a second node connection total, and a shared node connection total, wherein the first node connection total equals a number of nodes in the first set, wherein the second node connection total equals a number of nodes in the second set, and wherein the shared node connection total equals a total number of nodes resulting from a union of the first node set and the second node set;
    computing a mutual information (MI) metric using an MI calculation algorithm where the only variables of the MI calculation algorithm are based upon the first node connection total, the second node connection total and the shared node connection total, wherein the computed mutual information (MI) metric increases as the shared node connection total increases and decreases as the first node connection total and the second node connection total increase; and
    deciding whether a direct connection is to be added between the first node and the second node based upon a value of the computed mutual information (MI) metric, wherein a higher value for the computed mutual information (MI) metric is more likely to result in a direction connection being added than a lower value for the computed mutual information (MI) metric.

2. The computer-implemented method of claim 1, wherein the deciding of whether the direct connection is to be added between the first node and the second node is based entirely upon the value of the computed mutual information (MI) metric or is based a user input to a prompt for creating a direct connection between the first node and the second node where the prompt is based entirely upon the value of the computed mutual information (MI) metric.

3. The computer-implemented method of claim 1, wherein direct links with nodes of the first set and the first node and direct links with nodes of the second set and the second nodes comprise directional links, further comprising:
    filtering the first set and the second set to exclude at least a portion of the nodes in each set based upon a link directional state, wherein different link directional states comprise a unidirectional state, a node-to-reference direction, and a reference-to-node direction, wherein the computing of the first node connection total, the second node connection total, and the shared node connection total occurs after the filtering.

4. A computer program product of determining new connections between nodes comprising a computer readable storage medium having computer usable program code embodied thereupon, the computer usable program code comprising:
    computer usable program code configured to identify a homogonous set of nodes comprising a first set of a plurality of nodes, a second set of a plurality of nodes, a first node, and a second node, each node in the first set having a direct link to the first node, each node in the second set having a direct link to the second node, wherein no direct link exists between the first node and the second node computer usable program code configured to determine a first node connection total, a second node connection total, and a shared node connection total, wherein the first node connection total equals a number of nodes in the first set, wherein the second node connection total equals a number of nodes in the second set, and wherein the shared node connection total equals a total number of nodes resulting from a union of the first node set and the second node set;

computer usable program code configured to compute a mutual information (MI) metric using an MI calculation algorithm where the only variables of the MI calculation algorithm are based upon the first node connection total, the second node connection total and the shared node connection total, wherein the computed mutual information (MI) metric increases as the shared node connection total increases and decreases as the first node connection total and the second node connection total increase; and computer usable program code configured to decide whether a direct connection is to be added between the first node and the second node based upon a value of the computed mutual information (MI) metric, wherein a higher value for the computed mutual information (MI) metric is more likely to result in a direction connection being added than a lower value for the computed mutual information (MI) metric.

5. The computer program product of claim 4, wherein the deciding of whether the direct connection is to be added between the first node and the second node is based entirely upon the value of the computed mutual information (MI) metric or is based a user input to a prompt for creating a direct connection between the first node and the second node where the prompt is based entirely upon the value of the computed mutual information (MI) metric.

6. The computer program product of claim 4, wherein direct links with nodes of the first set and the first node and direct links with nodes of the second set and the second nodes comprise directional links, further comprising:

computer usable program code configured to filter the first set and the second set to exclude at least a portion of the nodes in each set based upon a link directional state, wherein different link directional states comprise a unidirectional state, a node-to-reference direction, and a reference-to-node direction, wherein the computing of the first node connection total, the second node connection total, and the shared node connection total occurs after the filtering.

7. A system of determining new connections between nodes comprising:

at least one processor;
a volatile memory;
a non-volatile memory; and
a bus communicatively linking the at least one processor, the volatile memory, and the non-volatile memory, wherein said at least one processor is configured to execute a computer program product, wherein execution of the computer program product causes the system to:

identify a homogonous set of nodes comprising a first set of a plurality of nodes, a second set of a plurality of nodes, a first node, and a second node, each node in the first set having a direct link to the first node, each node in the second set having a direct link to the second node, wherein no direct link exists between the first node and the second node determine a first node connection total, a second node connection total, and a shared node connection total, wherein the first node connection total equals a number of nodes in the first set, wherein the second node connection total equals a number of nodes in the second set, and wherein the shared node connection total equals a total number of nodes resulting from a union of the first node set and the second node set;

compute a mutual information (MI) metric using an MI calculation algorithm where the only variables of the MI calculation algorithm are based upon the first node connection total, the second node connection total and the shared node connection total, wherein the computed mutual information (MI) metric increases as the shared node connection total increases and decreases as the first node connection total and the second node connection total increase; and decide whether a direct connection is to be added between the first node and the second node based upon a value of the computed mutual information (MI) metric, wherein a higher value for the computed mutual information (MI) metric is more likely to result in a direction connection being added than a lower value for the computed mutual information (MI) metric.

8. The system of claim 7, wherein the deciding of whether the direct connection is to be added between the first node and the second node is based entirely upon the value of the computed mutual information (MI) metric or is based a user input to a prompt for creating a direct connection between the first node and the second node where the prompt is based entirely upon the value of the computed mutual information (MI) metric.

9. The system of claim 7, wherein direct links with nodes of the first set and the first node and direct links with nodes of the second set and the second nodes comprise directional links, and wherein execution of the computer program product further causes the system to:

filter the first set and the second set to exclude at least a portion of the nodes in each set based upon a link directional state, wherein different link directional states comprise a unidirectional state, a node-to-reference direction, and a reference-to-node direction, wherein the computing of the first node connection total, the second node connection total, and the shared node connection total occurs after the filtering.

* * * * *